United States Patent [19]
Warkotsch

[11] Patent Number: 5,665,911
[45] Date of Patent: Sep. 9, 1997

[54] MOUNTING FLANGE FOR A MOUNTING FIXTURE FOR MOUNTING WHEELS FROM DIFFERENT MAKES OF MOTOR VEHICLES ON THE SHAFT OF A BALANCING MACHINE

[75] Inventor: Horst Warkotsch, Burgwedel, Germany

[73] Assignee: Haweka Auswuchttechnik Horst Warkotsch, GmbH, Germany

[21] Appl. No.: 630,368

[22] Filed: Apr. 10, 1996

[30] Foreign Application Priority Data

Apr. 22, 1995 [DE] Germany ............... 295 06 853

[51] Int. Cl.$^6$ ................................................. G01M 1/06
[52] U.S. Cl. ................................................. 73/487
[58] Field of Search ............... 73/487, 484; 269/48.1

[56] References Cited

U.S. PATENT DOCUMENTS 3,521,494  7/1970  Carrigan ............................. 73/487
3,583,238  6/1971  Haynes .............................. 73/487
4,462,253  7/1984  Becher .............................. 73/487
4,478,081  10/1984  Greene ............................. 73/487

*Primary Examiner*—Christine K. Oda
*Attorney, Agent, or Firm*—Banner & Witcoff, Ltd.

[57] ABSTRACT

Mounting flange for a mounting fixture for mounting wheels from different makes of of motor vehicles on the shaft of a balancing machine. The mounting flange has multiple sets of centering holes lying on concentric circles surrounding the central guide hole for axial guidance of the flange on the shaft of the balancing machine. The centering holes receive centering pins terminating in conical ends which fit into the mounting holes in the automobile wheel being balanced. The centering holes of each set are identified by an appearance different from any other set, provided by a configuration or color in a depression in the surface of the mounting flange surrounding the centering hole. Thus, all the centering holes that belong to the same set can be quickly identified when inserting the centering pins. Because the identifying indicia are recessed, they are protected from wear and damage.

7 Claims, 1 Drawing Sheet

U.S. Patent  Sep. 9, 1997  5,665,911
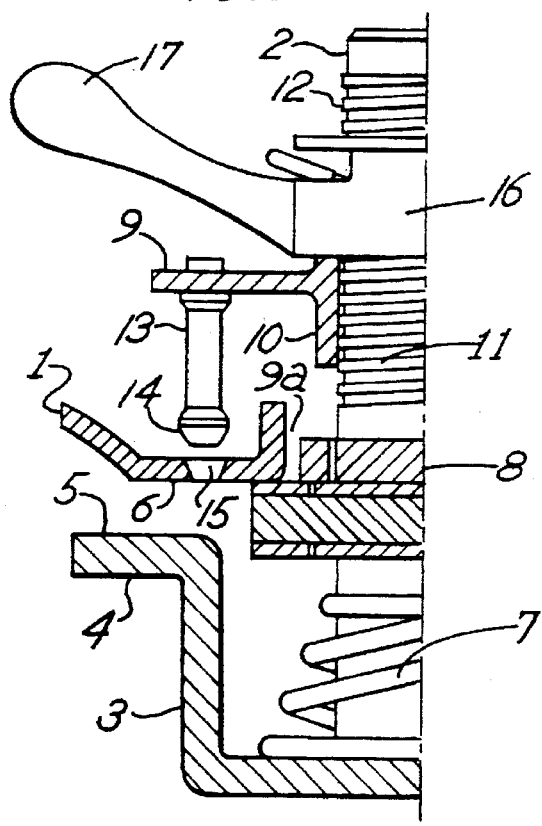
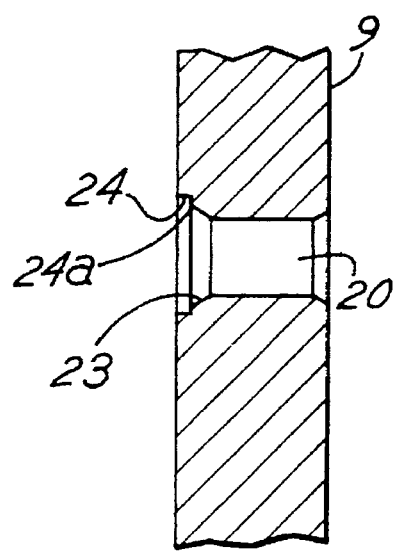
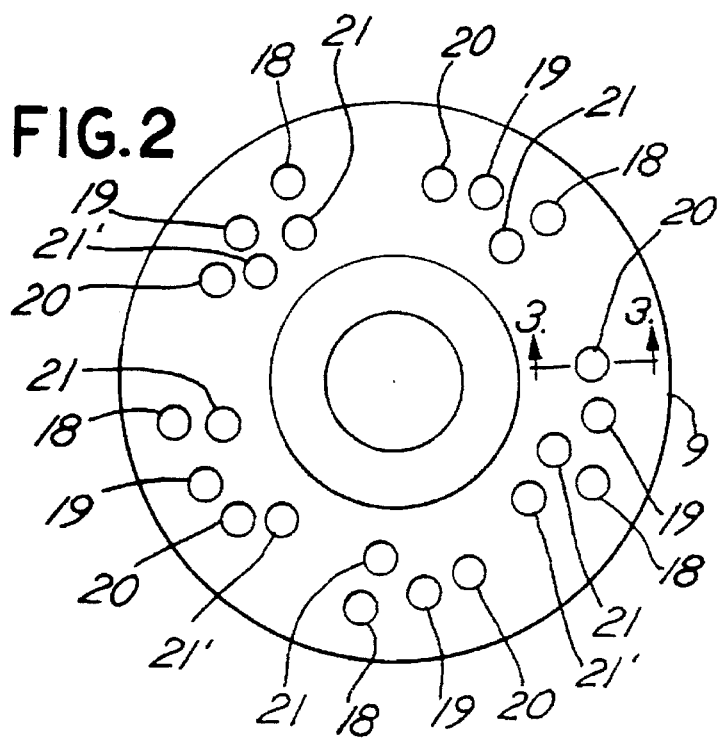
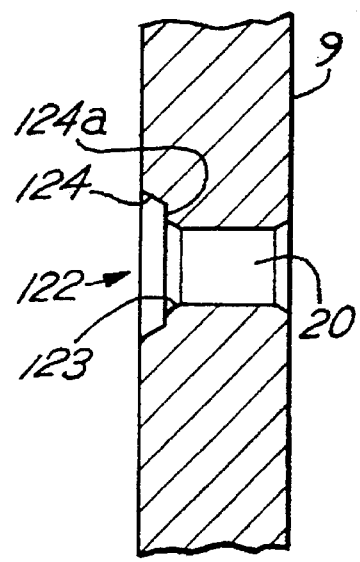

MOUNTING FLANGE FOR A MOUNTING FIXTURE FOR MOUNTING WHEELS FROM DIFFERENT MAKES OF MOTOR VEHICLES ON THE SHAFT OF A BALANCING MACHINE

This invention concerns a mounting flange for wheel balancing machines, which accommodates wheels having mounting holes of different spacings.

PRIOR ART

A known mounting flange of this type is distributed by the company HAWEKA Auswuchttechnik Horst Warkotsch GmbH (HAWEKA Horst Warkotsch Balancing Technology Co.) of 30928 Burgwedel, Germany, and is used with a chucking device for attaching wheels of different makes of motor vehicles to the shaft of a balancing machine. This known device is provided with at least two groups of axially parallel equally-spaced centering holes arranged on various circles having different diameters and/or in different numbers. The arrangement of holes corresponds to the arrangement of the lug bolt holes in the wheel rims of wheels of different makes of motor vehicles. In addition, the mounting flange has centering pins that can be inserted into the centering holes. The ends of the pins which project out of the centering holes have centering cones which fit into complementary lug bolt mounting holes in the wheel rims.

This known mounting flange is used by first inserting the centering pins into holes of a group or set arranged to correspond to the arrangement of holes in the wheel rim of the wheel to be mounted on the balancing machine. Then the wheel to be mounted is placed on the shaft of the balancing machine and precentered by means of a spring-loaded cone mounted on the shaft. The cone can be shifted along the shaft so it engages the central hole of the wheel rim of the wheel to be mounted on the balancing machine. The wheel is precentered by pressing it against this cone.

Then the mounting flange is positioned with its central guide hole on the shaft of the balancing machine such that the centering cones of the centering pins engage in the mounting holes in the wheel rim that serve to center the wheel. Then a tension nut is screwed onto a thread provided on the shaft of the balancing machine until the back side of the wheel rim presses tightly against a flange that is mounted on the shaft of the balancing machine. This flange makes it possible to align the wheel rim in a plane normal to the axis of the balancing machine. The centering cones of the centering pins that engage with the centering holes in the wheel rim permit radial centering of the wheel.

If a different type of motor vehicle wheel is to be mounted, the centering pins must be removed from the centering holes in the mounting flange and inserted into another set of axially parallel centering holes in the centering flange that are arranged to correspond to the arrangement of centering holes in the new type of wheel rim. Then the wheel is mounted in the manner described above.

Since there are a great many different types of wheel rims for automotive vehicle wheels with different arrangements of mounting holes, several different groups of arrangements of centering holes must be provided in the centering flange. The holes may differ in number and may be arranged on circles having different diameters. This results in a large number of complex arrangements of centering holes in the mounting flange, so it is difficult to locate the desired centering holes for a particular type of wheel rim quickly and reliably. Furthermore, it is practically impossible to mark the centering holes with numbers, letters, etc. because of the tight arrangement and lack of space.

SUMMARY OF THE INVENTION

The object of this invention is to provide a mounting flange of the type in question, where the problem of locating a specific set of centering holes corresponding to the centering pins of a particular wheel rim is greatly simplified.

This object is achieved by providing the visible ends of the centering holes on the insertion side for the centering pins with an appearance which permits permanent and easy identification. The ends of the centering holes each have a depression, and the depressions of one group or set of centering holes all have the same appearance while the depressions of different groups or sets of centering holes have a different appearance. Therefore, it is easy to differentiate the sets of centering holes, so it is readily possible to locate quickly the centering holes that correspond to a particular wheel rim and to insert the centering pins into these centering holes. Since the surfaces having different designs are provided in the depressions in the mounting flange, they are protected from damage and thus are permanent.

Essentially, the different appearances of the different sets of centering holes can be accomplished by any known method. However, the preferred appearance is characterized by the difference in shape and/or depth and/or diameter. The depressions of different sets of centering holes may have different colored surfaces. An advantage of this embodiment is that the depressions have a central conical inside part surrounded by an essentially cylindrical outside part adjacent the surface of the mounting flange. The conical part facilitates insertion of the centering pins. The base portion of the cylindrical part is not abraded when a centering pin is inserted, so the paint or any other form of color incorporated into the cylindrical part is not subject to wear or damage.

THE DRAWINGS

This invention will now be illustrated in greater detail with reference to the figures in which:

FIG. 1 is an axial section of half of a mounting fixture with one embodiment of a mounting flange according to this invention.

FIG. 2 is an enlarged axial view of the mounting flange according to FIG. 1.

FIG. 3 shows a section along line III—III in FIG. 2.

FIG. 4 shows a modified mounting flange taken in section similar to FIG. 3.

SPECIFIC EMBODIMENT

FIG. 1 shows half of an axial section through a mounting fixture for mounting a wheel rim 1 (shown only in part) of a motor vehicle wheel on a shaft 2 of a balancing machine. A base 3 having a flange 4 is fixed on shaft 2. A contact face 6 of wheel rim 1 comes to rest against the contact face 5 of flange 4 when the wheel is mounted. A conical spring 7 presses a stepped centering flange 8 on shaft 2 into a central hole 9a in wheel rim 1 and thus precenters the wheel during the mounting operation.

Mounting flange 9 having a cylindrical collar 10 is slidably mounted on shaft 2. The inside surface 11 of collar 10 rests on the thread 12 of shaft 2 with a narrow tolerance in such a way that it can be displaced. It thus holds mounting flange 9 in a plane normal to shaft 2 in any position and also centers it radially.

Centering pins 13 (only one of which is visible in FIG. 1) are inserted into mounting flange 9 from the underside. The free ends of these centering pins terminate in centering cones 14 that engage with the wheel mounting holes 15 (only one of which is illustrated in FIG. 1) during the centering operation. A tension nut 16 with a handle 17 for manipulating it is provided for tightening the mounting fixture.

FIG. 2 shows the mounting flange 9 on a slightly enlarged scale and in an axial view, where all the other parts including the mounting pins 13 have been omitted so as to show clearly the arrangement of centering holes. Five equally-spaced outer centering holes 18 form a first set of centering holes. Sets of five centering holes 19, 20 and 21 each lie on circles of successively smaller diameters. In addition there are three holes 21', that together with the hole 21, which is diametrically opposite the hole 21' in the lower left quadrant, form a set of four equally-spaced centering holes. The visible or outer ends of the centering holes 18–21, 21' are marked with different colors by set within recesses, as explained in detail below with reference to FIG. 3.

FIG. 3 is a view along line III—III in FIG. 2. The sectional view shows centering hole 20 that has a depression 22 in the outer surface of flange 9 with a frusto-conical inside wall 23 and a cylindrical outside wall 24 joined to wall 23 by an annular base or flat surface 24a. The depression is in the area of the left end in the figure, which is the side for insertion of the centering pins 13 (FIG. 1). The depression 22 is marked with a color especially in the area of its cylindrical part 24, 24a. All the centering holes within the same set have the same color code, whereas the color markings for the different sets are different. This makes it possible to quickly locate all the centering holes that belong to the same set when inserting the centering pins 13.

It is especially important that the depression, especially the cylindrical part 24, 24a of the depression 22 in the embodiment according to FIG. 3, is a recess that is practically inaccessible when centering pins 13 are inserted, so there is no danger that the color code will be damaged in this area or worn off over a period of time.

FIG. 4 is a view similar to FIG. 3 of a modified mounting flange. The flange 109 has a centering hole 120 that has a depression 122 in the outer surface with conical inside wall 123 and a frustro conical outside wall 124 joined to the frustro-conical inside wall 123 by an annular base or flat surface 12a. The depressions 122 have a configuration from the depression 122 is dimensioned so that the sidewall of the depressions 122 is deeper than the sidewall of the depression 22. It will be understood that the depression 122 may comprise one of the depressions in one of the sets of centering holes.

I claim:

1. Mounting flange for mounting a fixture for mounting wheels from different makes of motor vehicles on the shaft of a balancing machine which comprises a central hole in said mounting flange for axially guiding said mounting flange on said shaft, a first set of wheel centering holes surrounding said central hole equally spaced on a circle of one diameter and a second set of wheel centering holes equally spaced on a circle of a different diameter, removable centering pins equally disposed in said first or second set of wheel centering holes and terminating in centering cones, and a depression in the face of said mounting flange surrounding each wheel centering hole of the first and second set of centering holes, each one of said (depression) depressions in said first set having the same appearance, but different from the appearance of the depressions in said second set of centering holes.

2. The mounting flange of claim 1 in which said depressions in said first set have a different configuration from the depressions in said second set.

3. The mounting flange of claim 2 wherein said configuration of the depressions in said first set has a sidewall which is deeper than the sidewall of the depressions in said second set.

4. The mounting of claim 1 in which the depressions are colored, the depressions in said first set being colored differently from the depressions in said second set.

5. The mounting of claim 1 in which said depressions have a conical inside part adjoining a substantially cylindrical outside part.

6. The mounting of claim 1 in which said first set consists of five centering holes and said second set consists of four centering holes.

7. Mounting flange for mounting a fixture for mounting wheels from different makes of motor vehicles on the shaft of a balancing machine which comprises a central hole in said mounting flange for axially guiding said mounting flange on said shaft, a first set of wheel centering holes surrounding said central hole equally spaced on a circle of one diameter and a second set of centering holes equally spaced on a circle of the same diameter as the circle of the first set of wheel centering holes, removable centering pins equally disposed in said first or second set of wheel centering holes and terminating in centering cones, and a depression in the face of said mounting flange surrounding each wheel centering hole of the first and second set of centering holes, each one of said depressions in said first set having the same appearance, but different from the appearance of the depressions in said second set of centering holes.

* * * * *